United States Patent [19]

Straitz, III

[11] 4,092,908

[45] June 6, 1978

[54] FLUIDIC SEAL

[75] Inventor: John F. Straitz, III, Meadowbrook, Pa.

[73] Assignee: Combustion Unlimited Incorporated, Elkins Park, Pa.

[21] Appl. No.: 815,992

[22] Filed: Jul. 15, 1977

[51] Int. Cl.² ............................................. F23D 13/20
[52] U.S. Cl. ......................................... 98/60; 114/187
[58] Field of Search ............................ 98/55, 60, 119; 114/187; 126/307 A

[56] References Cited

U.S. PATENT DOCUMENTS

| 646,143 | 3/1900 | Dickinson | 98/60 |
| 3,730,673 | 5/1973 | Straitz | 126/307 A |

FOREIGN PATENT DOCUMENTS 1,279,897  11/1961  France ........................ 98/60

Primary Examiner—Robert I. Smith
Attorney, Agent, or Firm—Zachary T. Wobensmith, 2nd; Zachary T. Wobensmith, III

[57] ABSTRACT

A fluidic seal is provided for vent stacks which comprises a plurality of spaced frusto-conical concentric baffles with aligned central openings permitting free outward delivery of gas for discharge but providing an obstruction to reverse or return flow within the stack, the baffles at their openings being provided with static electricity preventing rings. Protection is afforded by the baffles against initiation of combustion due to static electricity and in the event of combustion of the discharging gas initiated by lightening preventing backflow in the stack.

6 Claims, 3 Drawing Figures

FLUIDIC SEAL

BACKGROUND OF THE INVENTION

1. Field of the Invention

This invention relates to vent stacks and more particularly to a fluidic seal for preventing static electricity formation upon discharge of gas through the vent stack.

2. Description of the Prior Art

In my prior U.S. Pat. No. 3,730,673 a vent seal is provided for use with vent stacks, flare systems and the like which comprises a diode interposed in the stack below the top, the diode comprising spaced frusto-conical concentric baffles with aligned central openings permitting free upward delivery of gas but providing an obstruction to downflow of air or gas within the stack. The baffles as shown in my U.S. Pat. No. 3,703,673 have relatively sharp edges which result in generating of static electricity by liquid particles of water or hydrocarbons in the flow stream passing over these edges.

SUMMARY OF THE INVENTION

In accordance with the present invention a fluidic seal is provided for vent stacks with provisions in the form of rings at the central openings of the baffles to prevent static electricity formation by the passage of liquid particles in the flow stream passing the edges. The baffles and their rings are made of heat resistant metal so that in the event of ignition of the gas being discharged from the vent stack by lightening or other causes the baffles will be resistant to the heat of combustion.

It is the principal object of the invention to provide a fluidic seal for vent stacks which will function with high discharge velocities, which will provide good gas dispersion into the atmosphere, which will prevent air entry back into the stack and which will prevent generation of static electricity attendant on the flow of waste gas.

It is a further object of the invention to provide a fluidic seal which will protect the stack from internal explosions, which will be light in weight, of low cost, which will not require any maintenance and which will be resistant to high temperature if the waste gas is ignited by an outside source.

It is a further object of the invention to provide a fluidic seal which will have a higher order of safety than prior vent stacks.

Other objects and advantageous features of the invention will be apparent from the description and claims.

BRIEF DESCRIPTION OF THE DRAWINGS

The nature and characteristic features of the invention will be more areadily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
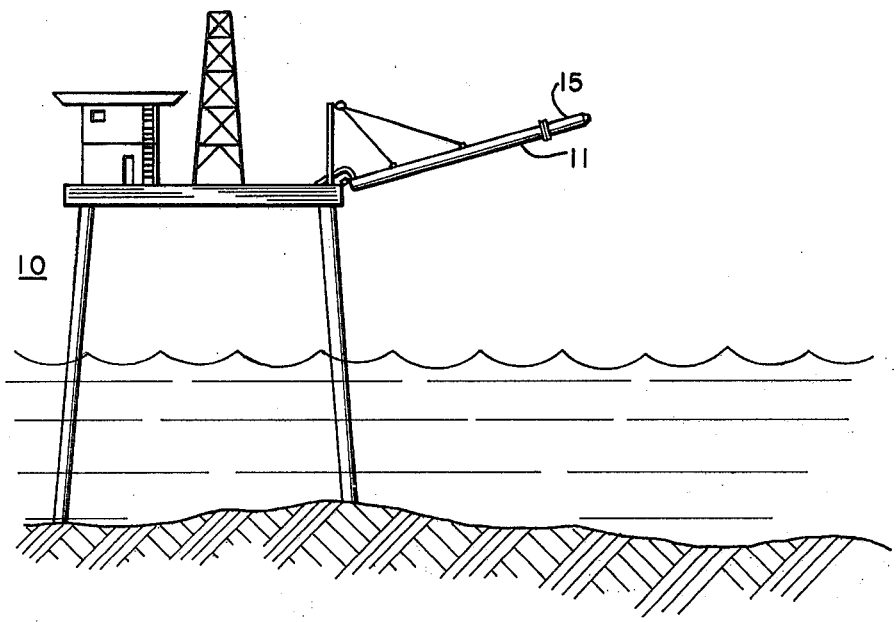
FIG. 1 is a view in elevation of a specific application of the vent stack for use in offshore installations.

Referring now more particularly to the drawings, FIG. 1 shows a specific application of the fluidic seal for vent stacks in accordance with the invention. An offshore platform 10 is shown with a vent stack 11 supported thereon.

The fluidic seal 12 for the vent stack 11 hereinafter described is not limited to offshore application, but can be used in plants for the disposal of combustible waste gases, from chemical processes and particularly from oil recovery or refining operations. Such stacks may be horizontal, vertical or inclined.

Figure 3:
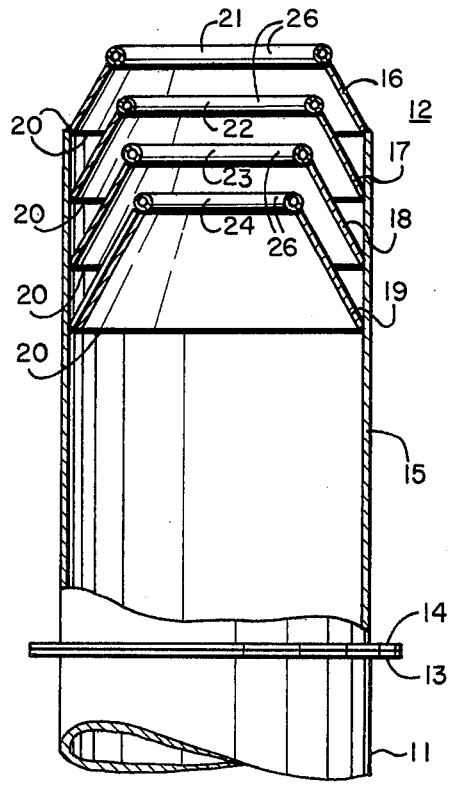
FIG. 3 is an enlarged end view of the tip of the vent stack shown in FIG. 2.
Figure 2:
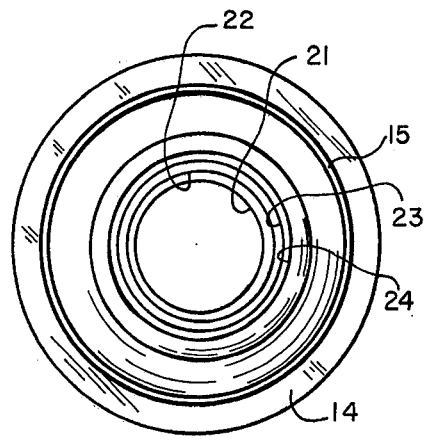
FIG. 2 is a vertical central sectional view of the tip of the stack shown in FIG. 1 and illustrating the fluidic seal of the invention.

Referring now more particularly to FIGS. 2 and 3 of the drawings the vent stack 11 is there shown, preferably of metal with a flange 13 for attachment of the flange 14 of a tip 15 which has built thereinto the fluidic seal 12 of the present invention.

As will be seen in FIG. 2 the fluidic seal 12 preferably comprises a plurality of frustoconical baffles 16, 17, 18 and 19 of metal of suitable gage or other suitable material which is not adversely affected by the temperature range of the waste gas, which may be from cryogenic temperatures ($-200°$ F) to temperatures in excess of $400°$ F. The baffles 16, 17, 18 and 19 terminate at their peripheries at the interior cylindrical face of the tip 15 and are preferably secured thereto by welding as at 20.

The baffles 16, 17, 18 and 19 preferably have axially aligned central openings 21, 22, 23 and 24 of increasing area and at the interior of each of the openings 21, 22, 23 and 24 are provided with rings 26 which can be formed of sheet metal or of piping and peferably of a diameter in the range from about one half of an inch to about one inch to avoid any formation of static electricity at these locations. The baffles 16, 17, 18 and 19 and the rings 26 are preferably made of metal which is resistant to high temperatures and for this purpose stainless steel, Inconel or Incoloy are suitable. The flanges 13 and 14 are preferably of forged steel.

The mode of operation will now be pointed out.

The vent stack 11 is particularly suited for the discharge of combustible waste gas containing water or hydrocarbon droplets or particles which would have a tendency to generate static electricity. The waste gas passing upwardly successively through the openings 24, 23, 22 and 21 can be of high discharge velocity of the order of 500 to 800 feet per second and advance without substantial restriction in its flow and with good gas dispersion beyond the end of the tip 15.

In the event of a tendency to backflow due to wind at the outer end of the tip 15 or due to low velocity of waste gas flow or contraction upon cooling of the waste gas, backflow through the tip 15 and the vent stack 11 will be prevented by the opposing action of the baffles which direct backflowing gas or air successively toward the openings 21, 22, 23 and 24 and thus a high pressure drop in the reverse or backflow direction to obstruct the backflow. Formation of static electricity is avoided but in the event that the discharging gas is ignited by lightning or by some other outside source backflow is still prevented by the baffle action. The construction of the baffles 16, 17, 18 and 19 and their rings 26 of heat resistant metals prevents the destruction of the baffles 16, 17, 18 and 19 and the rings 26 in the event of such ignition.

I claim:

1. A vent stack for waste gas comprising, in said stack,
   a fluidic diode permitting flow for discharge of combustible waste gas and obstructing return flow in the stack,
   said fluidic diode comprising at least one axially aligned frustoconical baffle with a central opening, and means for inhibiting static electricity generation at said diode comprising a ring in surrounding relationship to a baffle central opening having a smooth surface curved in the direction of discharge gas flow.

2. A vent stack as defined in claim 1 in which
   said fluidic diode is at the terminal end of the vent stack.

3. A vent stack as defined in claim 1 in which
   said fluidic diode comprises a plurality of axially aligned frustoconical baffles with aligned central openings, and
   each of said central openings has therearound a curved surface for inhibiting static electricity generation.

4. A vent stack as defined in claim 3 in which
   said central openings have rings therearound providing said curved surfaces.

5. A vent stack as defined in claim 4 in which
   said baffles and said rings are of heat resistant metal.

6. A vent stack as defined in claim 3 in which
   said central openings are of increasing diameter towards the discharge end of the diode.

* * * * *